United States Patent
Schluter (10) Patent No.: US 8,505,860 B2
(45) Date of Patent: Aug. 13, 2013

(54) VIDEO SCREEN MOUNTING SYSTEM

(75) Inventor: Robert Schluter, Kinnelon, NJ (US)

(73) Assignee: Middle Atlantic Products, Inc., Fairfield, NJ (US)

( * ) Notice: Subject to any disclaimer, the term of this patent is extended or adjusted under 35 U.S.C. 154(b) by 211 days.

(21) Appl. No.: 12/977,834

(22) Filed: Jan. 25, 2011

(65) Prior Publication Data

US 2011/0233346 A1    Sep. 29, 2011

Related U.S. Application Data

(60) Provisional application No. 61/317,068, filed on Mar. 24, 2010.

(51) Int. Cl.
*A47F 5/00* (2006.01)
*E04G 3/00* (2006.01)

(52) U.S. Cl.
USPC ............... 248/125.1; 248/125.3; 248/219.1; 248/287.1; 248/298.1

(58) Field of Classification Search
USPC ........ 248/121, 125.8, 122.1, 124.1, 126–127, 248/161, 163.1, 214, 215, 218.4, 219.1, 219.3, 248/274.1, 917, 125.1, 241, 243, 187.1, 297.21, 248/298.1; 211/90.01, 94.01, 94.02, 99–104
See application file for complete search history.

(56) References Cited

U.S. PATENT DOCUMENTS

| | | | | |
|---|---|---|---|---|
| 3,250,584 A | * | 5/1966 | Tassell | 312/247 |
| 4,212,445 A | * | 7/1980 | Hagen | 248/245 |
| 5,944,896 A | * | 8/1999 | Landesman et al. | 118/500 |
| 7,195,213 B2 | * | 3/2007 | Weatherly | 248/125.1 |
| 7,300,029 B2 | * | 11/2007 | Petrick et al. | 248/285.1 |
| D567,546 S | * | 4/2008 | Liu | D6/479 |
| D595,978 S | * | 7/2009 | Portnoy et al. | D6/477 |
| 7,575,212 B1 | * | 8/2009 | Langelius | 248/243 |
| 7,854,415 B2 | * | 12/2010 | Holbrook et al. | 248/125.2 |
| 8,276,864 B2 | * | 10/2012 | Ye et al. | 248/287.1 |
| 2007/0103605 A1 | | 5/2007 | Maruta | |

FOREIGN PATENT DOCUMENTS

| | | |
|---|---|---|
| KR | 20-0419281 | 6/2006 |
| KR | 10-0930600 | 12/2009 |

OTHER PUBLICATIONS

Aluminum Framing, Linear Motion and Assembly Technologies; Bosch Rexroth Corp., pp. 2-7, 2-61, 10-13, dated Dec. 2009.
Item Catalog—Support Profiles w/o grooves, Online Catalogue item; item Industrietechnik GmbH, p. 1 of 1; http://catalog.item24.us/index.php?cat=c1000024031_Support-Profiles-w-o-grooves.html dated Dec. 23, 2010.
Item Catalog—Conduit Profiles E, Online Catalogue item, item Industrietechnik GmbH, pp. 1 of 2; http://catalog.item24.us/index.php?cat=c1000028583_Conduit-Profies-E-.html; dated Dec. 23, 2010.

(Continued)

*Primary Examiner* — Tan Le
(74) *Attorney, Agent, or Firm* — Drinker Biddle & Reath LLP (57) ABSTRACT

A video screen mounting system including a vertical post having a mounting wall, a base supporting the vertical post, a cross beam having a body, a mounting leg extending rearwardly from the body, and at least one mounting channel located on one or more of a front, a top, and a bottom of the body, and a bracket removably mountable on the mounting wall of the vertical post and having a frontwardly extending flange for receiving and retaining the mounting leg of the cross beam.

19 Claims, 9 Drawing Sheets

(56) References Cited

OTHER PUBLICATIONS

Item Catalog—Modular Conduit System, Online Catalog item; item Industrietechnik GmbH, p. 1 of 1; http://catalog.item24.us/index.php?cat=c1000027707__Modular-Conduit-System-.html; dated Dec. 23, 2010.

International Search Report and Written Opinion, dated Nov. 15, 2011, 8 pages.

* cited by examiner

VIDEO SCREEN MOUNTING SYSTEM

RELATED APPLICATION

This application is a utility application claiming priority to U.S. Provisional Application No. 61/317,068, filed Mar. 24, 2010, which is incorporated herein by reference in its entirety.

BACKGROUND

Modern video screens, including as LED, LCD, and plasma television sets, are typically nearly two-dimensional, with a wide and high video screen surface having minimal thickness. As a result, while such video screens are not as readily mounted on a shelf or flat surface as were their cathode ray tube predecessors, they can be more readily mounted on a wall or support from the rear to provide a sleek and clean look. Additionally, because video screens are often used in sales, advertising, trade shows, and the like, it is often desirable to have a mounting system that is portable, versatile, and easily assembled and disassembled, and yet rugged and stable.

SUMMARY

An embodiment of a video screen mounting system is disclosed including a vertical post having a mounting wall, a base supporting the vertical post, a cross beam, and a bracket. The cross beam has a body, a mounting leg facing rearwardly with respect to the body, and at least one mounting channel located on one or more of a front, a top, and a bottom of the body. The bracket is adapted to be removably mountable on the mounting wall of the vertical post and has a frontwardly extending flange for receiving and retaining the mounting leg of the cross beam.

Another embodiment of a video screen mounting system is disclosed having at least two vertical posts each having a mounting wall with pairs of mounting slots and a base corresponding to each mounting post. A vertical bracket extends upwardly from the base and slidingly engages the corresponding vertical post for interconnecting each base to its respective vertical post. The mounting system further includes at least two cross beams and a plurality of brackets. The cross beams each have a body, a mounting leg facing rearwardly with respect to the body, and a plurality of mounting channels located on one or more of a front, a top, and a bottom of the body. The brackets are each adapted to be removably mounted on the mounting wall of a vertical post. Each bracket includes a pair of rearwardly facing locking tabs for engaging the mounting slots on the mounting wall, and has a frontwardly extending flange with an upwardly facing recess for receiving and retaining the mounting leg of a corresponding cross beam.

An embodiment of an extruded vertical post for use in a video screen mounting system is disclosed, the vertical post having a front mounting wall, a rear wall, and a pair of support walls joining the front mounting wall to the rear wall. The support walls are separated by a slot of at least about ¾" in width and are positioned to form a pair of laterally outwardly opening wiring channels for receiving wiring for one or more video screens. The support walls and the slot constitute a barrier to electromagnetic interference between wires installed in one of the channels and wires installed in the other of the channels. The slot is also adapted to receive a bracket into an end of the vertical post. The channels are adapted to receive covers for concealing wiring installed within the wiring channel.

An embodiment of an extruded base for use in a video screen mounting system is disclosed, the base including a bottom member, two spaced apart lateral side members extending upwardly from the bottom member, a pair of walls located laterally inward from the side members and extending upwardly from the bottom member, the walls defining a longitudinal channel adapted to receive a bracket, and at least one adjustable foot extending downwardly from the bottom member. Wiring channels are formed between each side member and an adjacent wall for receiving wiring, the channels being adapted to receive covers for concealing the wiring installed within the wiring channel.

DETAILED DESCRIPTION

Figure 1:
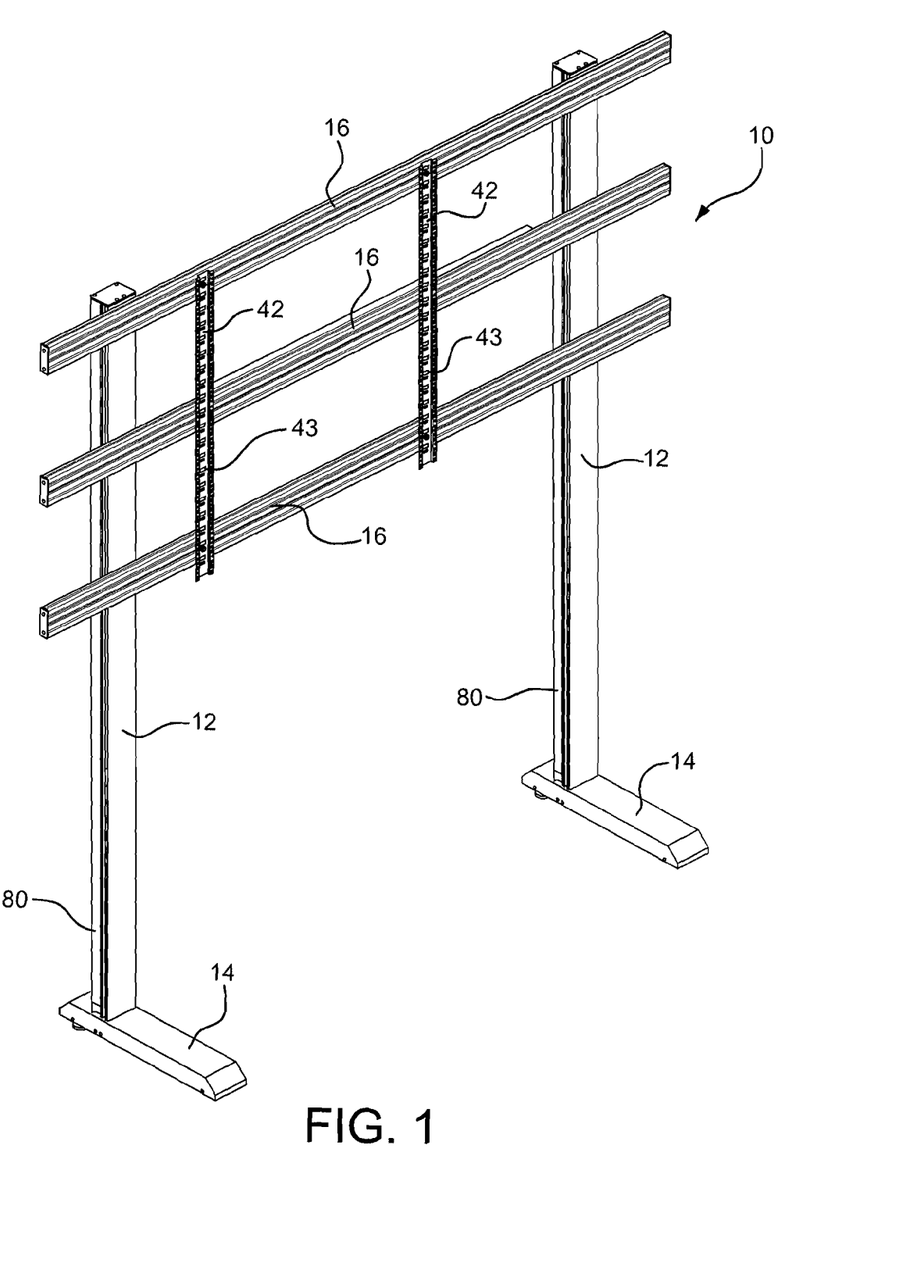
FIG. 1 is a front perspective view of a video screen mounting system.

An embodiment of a video screen mounting system 10 is shown in FIG. 1. The mounting system 10 has a frame-like structure for supporting a video screen or multiple video screens in close proximity to one another. Various video screens or displays can be mounted on the mounting system 10, including but not limited to LCD, LED, or plasma television sets or monitors. The mounting system 10 is shown in an exemplary use supporting two video screens 100 in FIG. 7.

The mounting system 10 includes one or more vertical posts 12 each supported at a lower end by a horizontal base 14, and one or more cross beams 16 supported by the vertical posts 12. When two or more vertical posts 12 are provided, the vertical posts 12 are spaced apart in a lateral direction and the cross beams 16 interconnect the vertical posts 12 together. The horizontal base 14 extends from a lower end of its respective vertical post 12 in a frontward-rearward direction perpendicular to the lateral direction so as to provide a stable free-standing structure.

Figure 9:
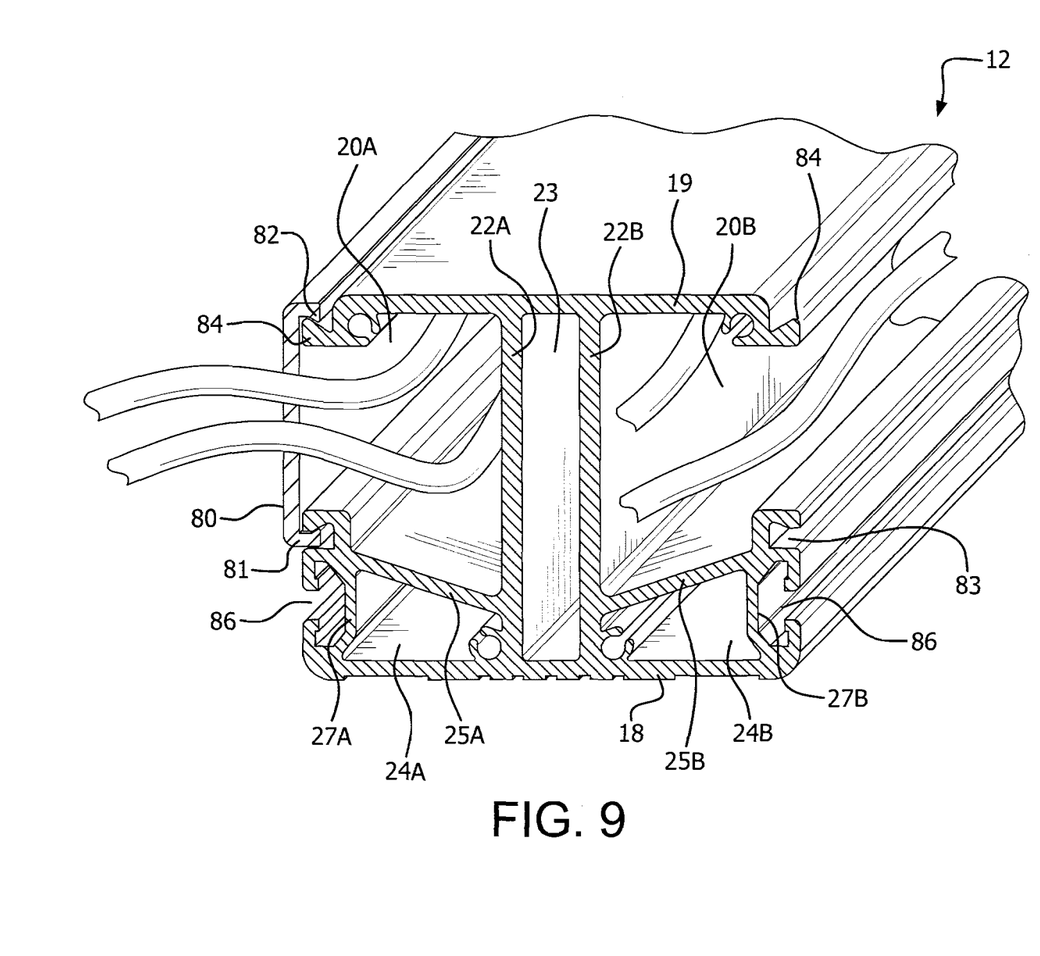
FIG. 9 is a cross-sectional view of a vertical post in a video screen mounting system as in FIG. 1.

The vertical post 12 is preferably constructed as a compartmented structure that includes a front mounting wall 18, a rear wall 19, a pair of supporting walls 22A, 22B interconnecting the mounting wall 18 with the rear wall 19, and a pair of wiring channels 20A, 20B located between the mounting wall 18 and the rear wall 19 and bounded on one side by one of the supporting walls 22A, 22B, respectively. The vertical post 12 can be made as an extrusion, for example from extruded aluminum or steel material. Each wiring channel 20A, 20B is defined as a generally C-shaped channel by the mounting wall 18, the rear wall 19, and a respective one of the supporting walls 22A, 22B. The wiring channels 20A, 20B preferably extend along the entire length of vertical post 12. The wiring channels 20A, 20B are adapted to receive and conceal wiring or cables from one or more video screens mounted on the mounting system 10, as discussed in further detail below.

Figure 5:
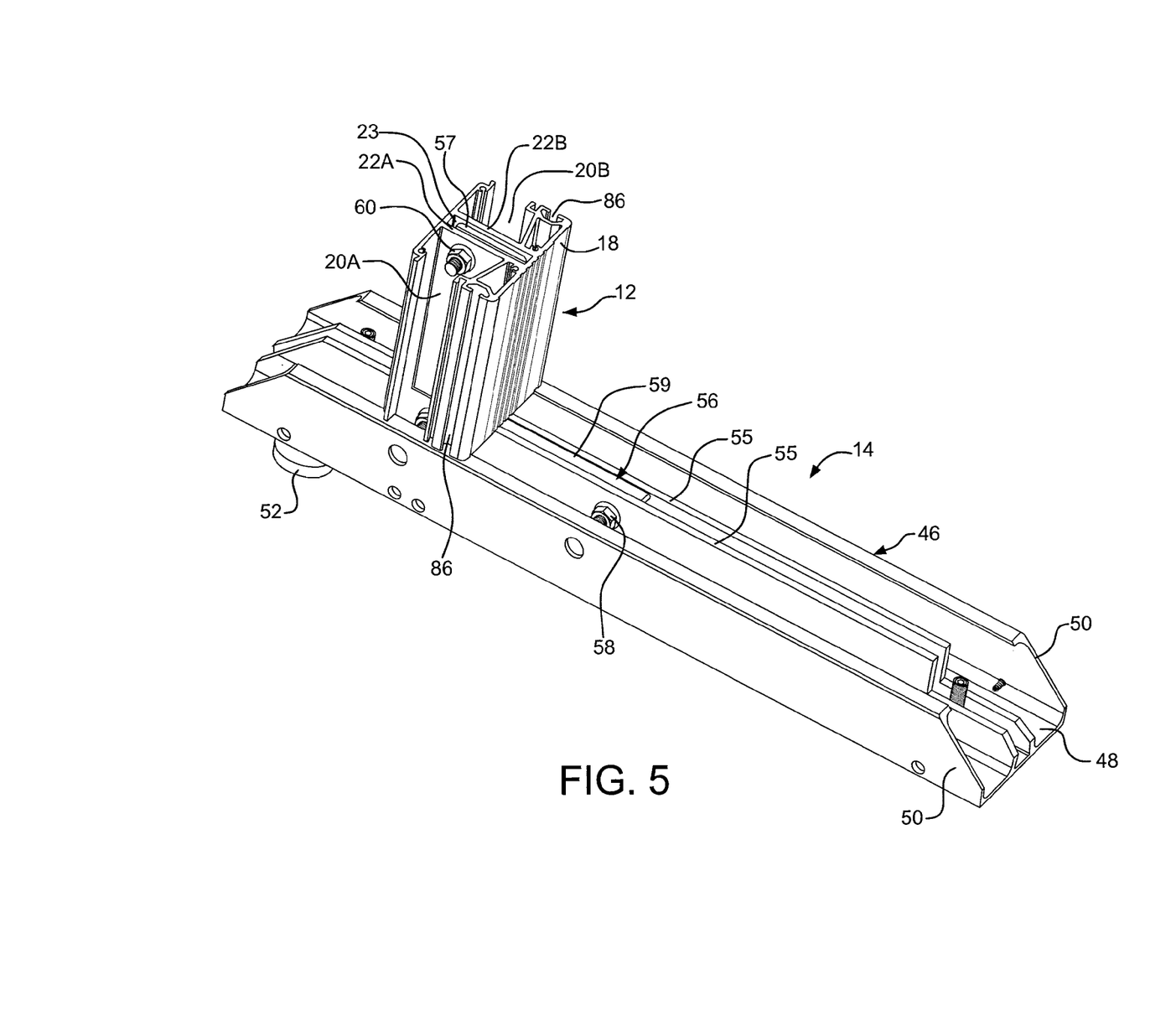
FIG. 5 is an expanded perspective view of a lower portion of a vertical post and base as in FIG. 4.
Figure 6:
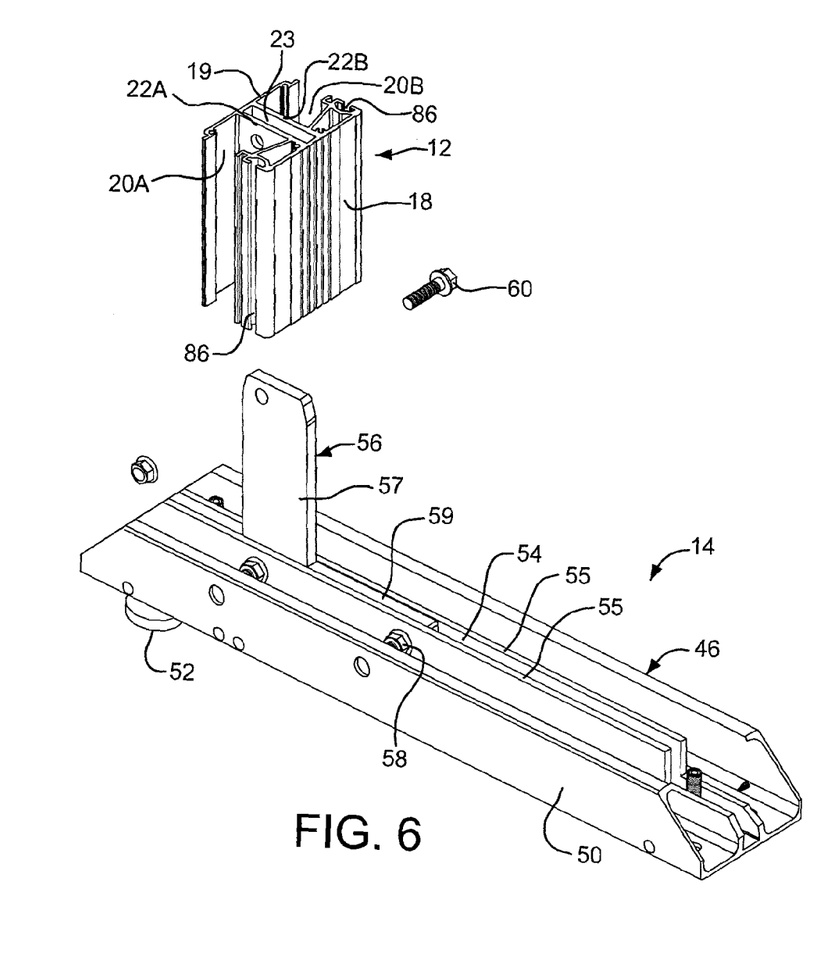
FIG. 6 is a partially exploded expanded perspective view of a lower portion of a vertical post as in FIG. 5.

In the embodiment depicted in FIGS. 5 and 6, the supporting walls 22A, 22B, in combination with interior walls 25A, 25B and partial side walls 27A, 27B, function as an interior web of the vertical post 12 which imparts structural rigidity to the post 12 to enable it to support the load of video screens mounted adjacent to the front mounting wall 18. The interior web includes a pair of enclosed vertical cavities 24A, 24B, each bounded by a portion of the mounting wall 18, a portion of a respective one of the support walls 22A, 22B, and a respective one of each of the interior walls 25A, 25B and the partial side walls 27A, 27B.

The supporting walls 22A, 22B are spaced apart to define a vertical gap or slot 23 therebetween. The combination of the vertical slot 23 and the supporting walls 22A, 22B creates a shield to minimize or inhibit the transmission of electromagnetic interference (i.e. an EMF shield) so that, for example, power wires routed in one of the wiring channels 20A, 20B do not cause any electrical interference with low voltage signal wires routed in the other of the wiring channels 20A, 20B. In a preferred embodiment, the vertical slot 23 has a width of at least about ¾" which the inventors have determined to provide sufficient spacing of the wiring channels to inhibit EMF transmission. A mounting channel 86 is preferably formed laterally outward from each of the partial side walls 27A, 27B for use in securing video equipment to the vertical post 12, as described further below.

Figure 2:
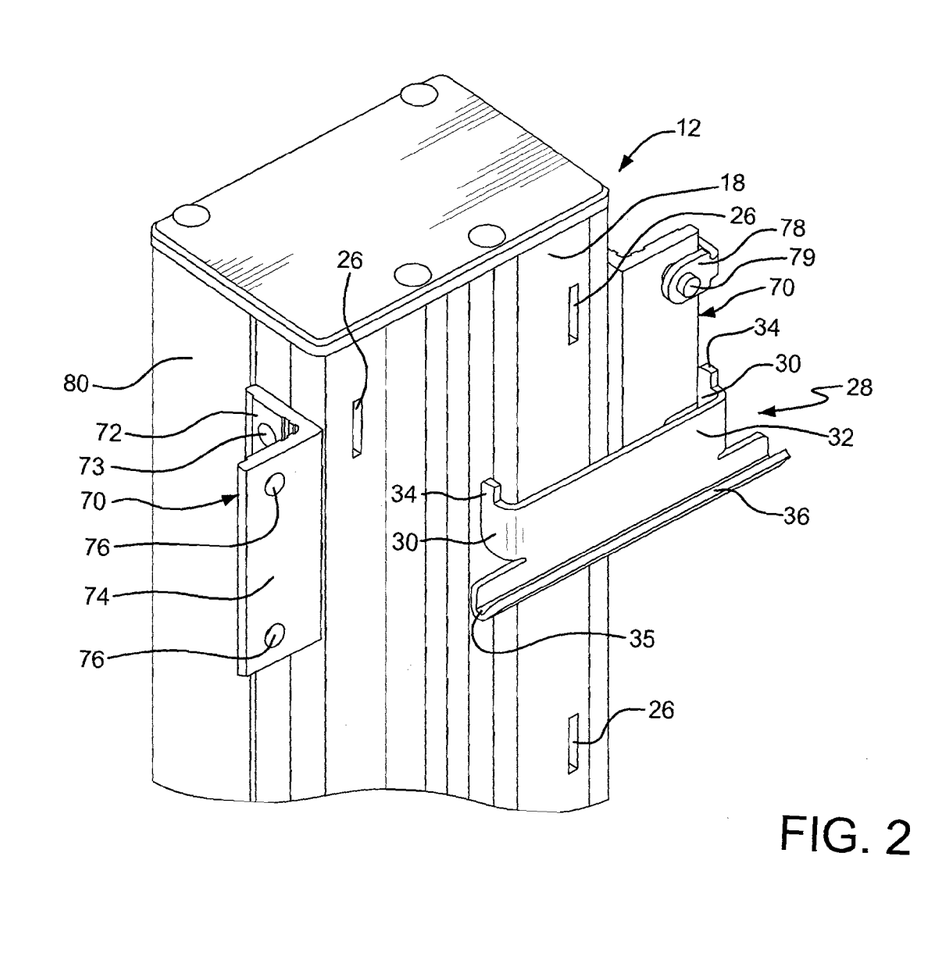
FIG. 2 is a partial expanded perspective view of an upper portion of a vertical post of a video screen mounting system as in FIG. 1.
Figure 7:
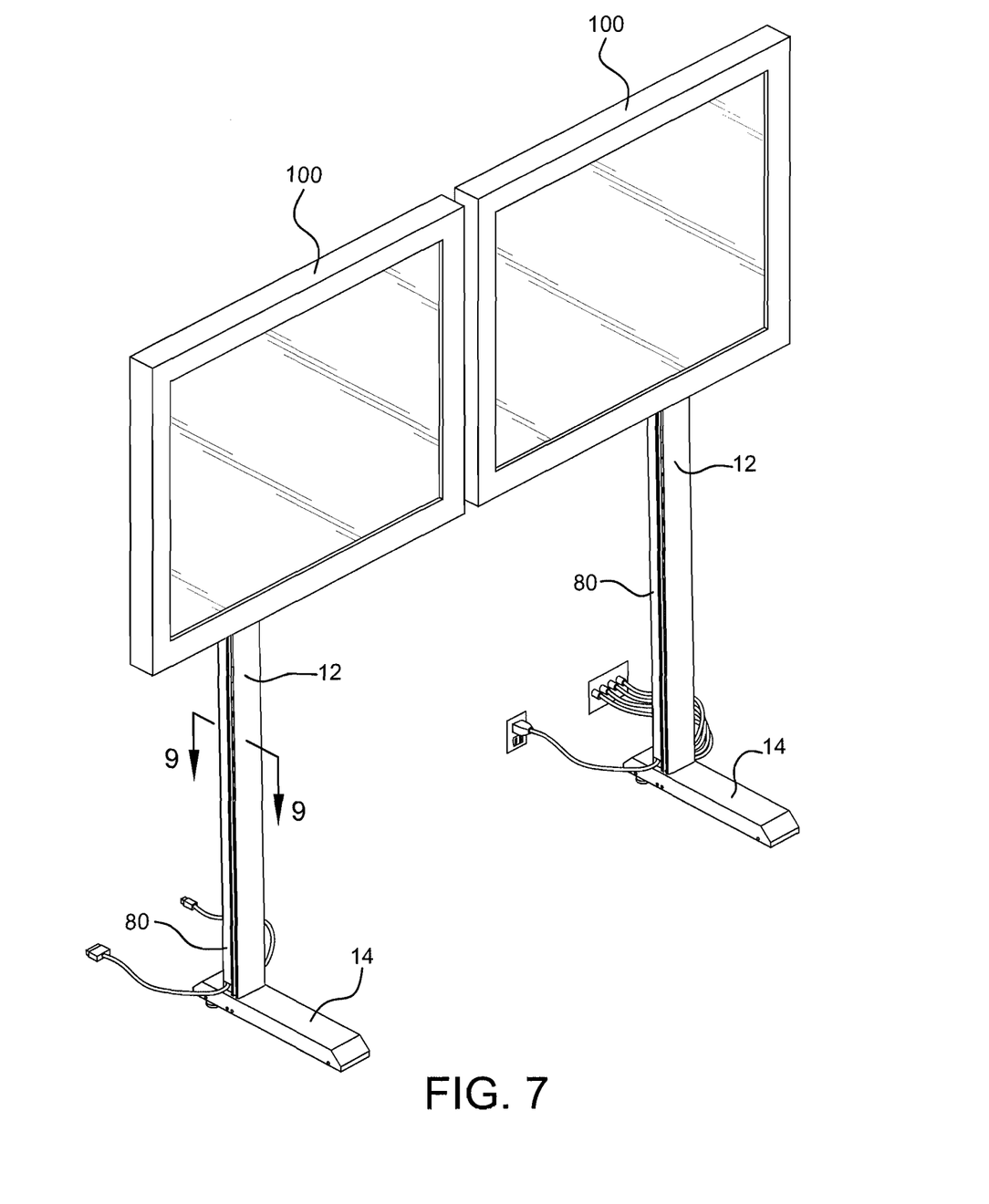
FIG. 7 is a front perspective view of video screens mounted on a video screen mounting system as in FIG. 1.
Figure 8:
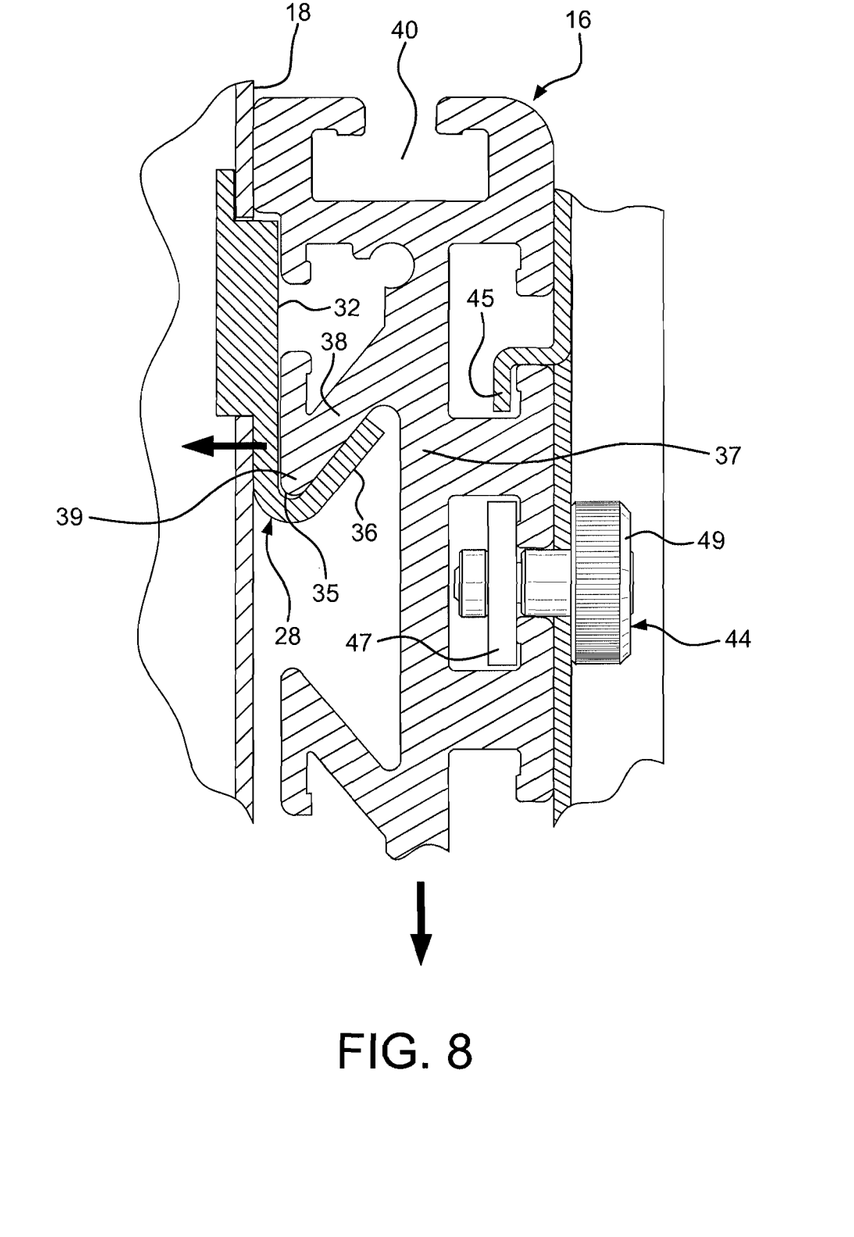
FIG. 8 is an expanded cross-sectional view of the cross-beam mounted to a vertical post as in FIG. 3 but with the cross-section being taken through a leg of the bracket.

As shown in FIGS. 1, 2, and 7, a removable cover 80 may be provided on each side of the vertical post 12. Each cover 80 attaches to the mounting wall 18 and the rear wall 19 to enclose one of the wiring channels 20A, 20B. In a preferred embodiment, each side of the vertical post 12 includes a cover mounting slot 83 that extends rearwardly from a respective partial side wall 27A, 27B and a cover mounting lip 84 that extends laterally outwardly from the rear wall 19. The cover 80 includes a first lip 81 and a second lip 82 adapted to be received by the slot 83 and the lip 84 for securing the cover 80 to the vertical post 12.

In a preferred embodiment, two vertical posts 12 are used, thereby providing four separate internal channels, that is a pair of channels 20A, 20B within each vertical post 12, for routing of wiring needed to operated video screens. In this embodiment, one channel is used for serial, data, contact closure, and/or control wires, a second channel is used for fiber optics, networking, Ethernet, and/or digital data wires, a third channel is used for AC and/or DC power wires, and a fourth channel is used for analog and/or digital video wires. Separating different types of wiring into different channels permits easy replacement of a particular wire without having to pull an entire bundle, and prevents kinks in the wiring, which is especially important with regard to the fiber optic lines.

At least one vertically oriented bracket slot 26 is formed on the mounting wall 18 of the vertical post 12. In the embodiment depicted in FIG. 2, the bracket slots 26 are arranged in pairs. Multiple pairs of bracket slots 26 may be provided in the mounting wall 18 of the vertical post 12, each pair of bracket slots 26 being located at a different vertical position along the vertical post 12. Each pair of slots 26 is designed to receive and retain a bracket 28 for supporting a cross beam 16. In the depicted embodiment, the bracket 28 has a lateral support body 32 and a pair of rearwardly facing locking tabs 30 that extend outward from a rear side of the support body 32. Each locking tab 30 includes an upward projecting tooth 34. In a preferred embodiment, the mounting bracket 28 is precision stamped from steel to include a J-shaped or V-shaped channel.

The bracket 28 is installed onto the vertical post 12 by first inserting the upward projecting teeth 34 at an angle into the bracket slots 26 and then tilting the bracket 28 to its final vertical orientation as the locking tabs 30 are fully received into the slots 26. Once in position, the support body 32 rests against an outer side of the mounting wall 18. In addition, the upward projecting teeth 34 may engage an inner side of the mounting wall 18. When installed on the vertical post 12, the bracket 28 lies flush against the post 12 and is supported essentially in shear, meaning that any vertical load carried by the bracket 28 is transmitted in a nearly vertical downward direction to the post 12. To remove the bracket 28, the support body 32 is lifted upward and outward from the mounting wall 18, and once the bracket 28 is angled with respect to the mounting wall 18, the bracket 28 is moved outward to free the locking tabs 30 and upward projecting teeth 34 from the bracket slots 26.

A forward facing flange 36 extends from a lower end of the support body 32. The flange 36 has a shape adapted for holding a portion of the cross beam 16. In the depicted embodiment, the flange 36 has a generally V-shaped or J-shaped upwardly facing recess 35 such that a downwardly protruding tip 39 of the cross beam 16 can rest and remain in the flange 36 under the force of gravity. While only one bracket 28 is shown in the figures, it is readily apparent that multiple brackets 28 can be mounted to each vertical post 12 for the purpose of supporting one cross beam 16 at multiple horizontal locations as well as for supporting more than one cross beam 16 at different vertical locations.

Anchoring angles 70 are located on the vertical post 12 on either side of the bracket slots 26 to enable securing of the cross beam 16. One leg 72 of each angle 70 is secured to a side of the vertical post 12 by a fastener that extends through a hole 73 in the leg 72 into the mounting channel 86, while another leg 74 of each angle 70 is disposed substantially parallel to the mounting wall 18 of the vertical post 12. The leg 74 includes at least one aperture 76 adapted to receive a fitting 78. The fitting 78 can be used to aid in securing the cross beam 16 on the bracket 28. In one embodiment, as depicted in FIG. 2, the fitting 78 is a grommet made of a flexible material such as rubber to provide for frictional contact with the cross beam 16, and includes a nub 79 adapted to inserted into an aperture in a rear of the cross beam 16. In another embodiment (not shown), the fitting 78 can be a thumb screw or other similar fastener for threading into a rear of the cross beam 16.

Figure 3:
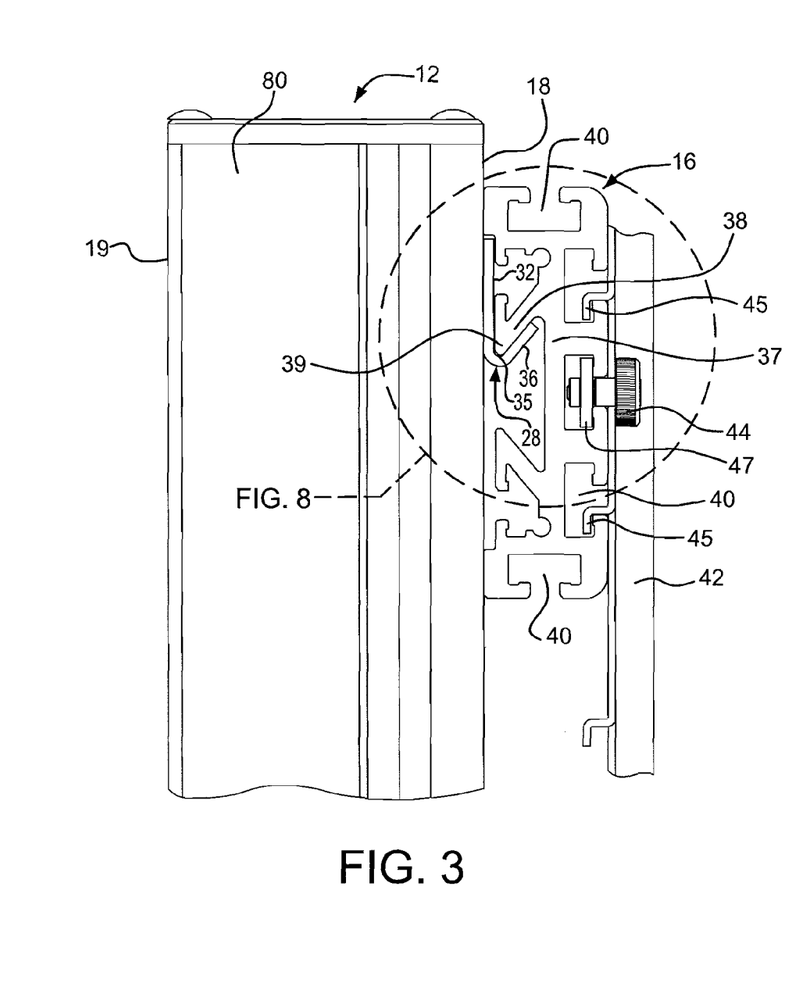
FIG. 3 is a side view of a cross-beam mounted to a vertical post in a video screen mounting system as in FIG. 1.

FIG. 3 shows a side view of one embodiment of the cross beam 16. The cross beam 16 is preferably made from a unitary extruded structure and is formed from an extrudable material such as aluminum or plastic. The cross beam 16 includes a main body 37, at least one mounting leg 38 extending rearwardly and downwardly from the body 37, and one or more mounting channels or slots 40 extending frontwardly, upwardly, and/or downwardly from a front, a top, and a bottom of the body 37, respectively. The mounting leg 38 and the mounting channels 40 extend horizontally along at least a portion of the length of the cross beam 16, and preferably along the entire length of the cross beam 16.

The mounting leg 38 has a tip 39 configured to be captured and supported by the upwardly facing recess 35 of the flange 36 on the bracket 28. As shown in FIG. 3, the mounting leg 38 includes a generally V-shaped or J-shaped tip 39 to mate with and rest within the upwardly facing recess 35 of the flange 36.

When the leg 38 of the cross beam 16 is received into the recess 35 of the bracket 28, the corresponding slopes of the leg 38 and the flange 36 pull the cross beam 16 toward the post 12, and as more weight is added to the cross beam, the more the cross beam 16 is pulled toward the vertical post 12. By extending horizontally along the length of the cross beam 16, the mounting leg 38 allows the cross beam 16 to slide horizontally with respect to the bracket 28 to enable adjustment of the cross beam 16 relative to the vertical post 12. In the illustrated embodiment the cross beam 16 is a symmetric extrusion with the upper and lower portions being mirror images of one another to facilitate mounting of the cross beam 16 on the bracket 28.

The mounting channels 40 are preferably formed on the front, the top, and the bottom sides of the cross beam 16 to provide for various mounting locations. Video panels and other equipment can be secured directly to the cross beam 16 via the mounting channels 40. Alternatively, vertical mounting brackets 42 can be supported by the mounting channels by way of mounting tangs 45 that extend rearwardly from each mounting bracket 42. The mounting tangs 45 allow the mounting brackets 42 to be quickly and easily engaged with the cross beam 16, because when each mounting tang 45 is inserted into a corresponding mounting channel 40 in the cross beam 16 and the mounting brackets 42 are allowed to be pulled downward under their own weight, the mounting tangs 45 securely latch into the cross beam 16. The mounting bracket 42 provides various mounting apertures 43 to which video panels and other equipment can be mounted.

Although the weight of the mounting brackets 42 themselves, plus the weight of the video screens, is sufficient to ensure that the mounting tangs 45 are retained in the cross beams 16, thumb screws 44 or other fasteners known in the art may be provided to ensure that the mounting brackets 42 cannot be inadvertently lifted off of the cross beams 16. A washer 47 mounted on a rear portion of the thumb screw 44 is retained in a channel 40 of the cross beam 16 while a head 49 on the thumb screw 44 contacts the mounting bracket 42 to hold the mounting bracket 42 securely against the cross beam 16. Because the washer 47 can slide horizontally with in the channel 40 of the cross beam 16, the thumb screws 44, and thus the mounting brackets 42, can be positioned anywhere along the cross beam 16.

Figure 4:
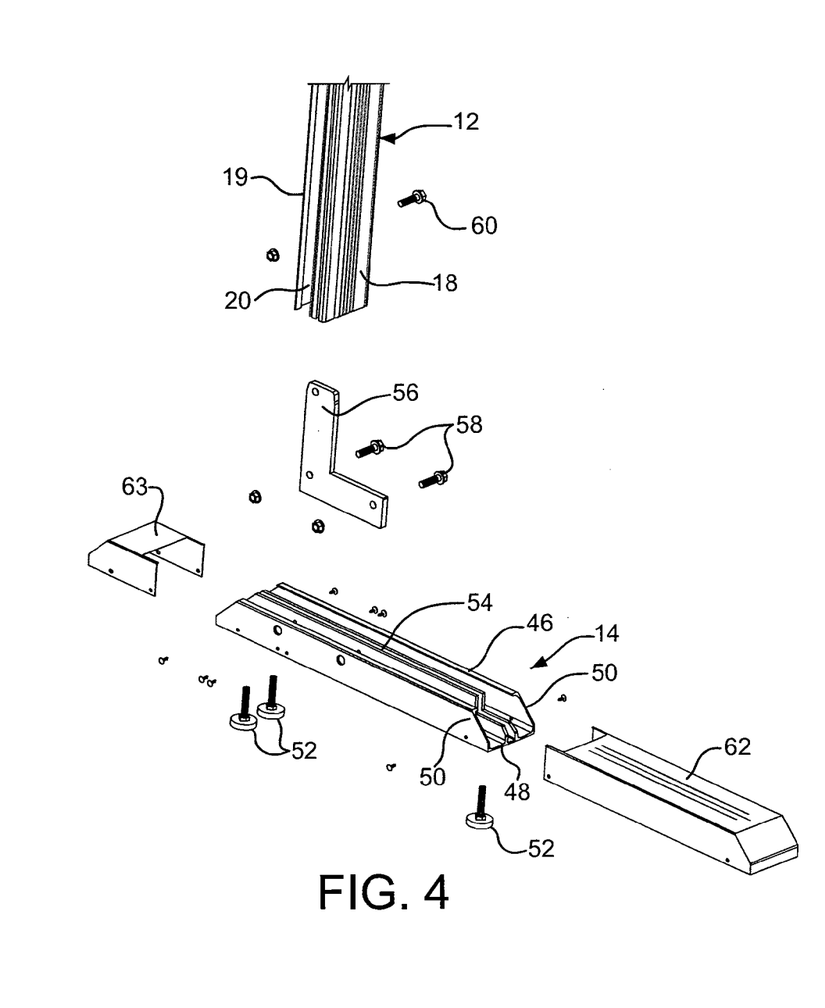
FIG. 4 is a exploded perspective view of a lower portion of a vertical post and base of a video screen mounting system as in FIG. 1.

FIGS. 4-6 illustrate an embodiment of the base 14, and the attachment of the vertical post 12 to the base 14. The base 14 includes a U-shaped base support 46 having a bottom member 48 and two spaced apart lateral side members 50 extending upward from the bottom member 48. One or more adjustable feet 52 may be adjustably attached to the bottom member 48 in a conventional manner to enable leveling of the base 14. In the illustrated embodiment, the base 14 further includes a center channel 54 bounded by spaced apart walls 55 that extending upwardly from the bottom member 48. The center channel 54 is configured to receive a bracket 56 for interconnecting the base 14 to the vertical post 12.

The base 14 includes a wiring channel 66 located between each of the side members 50 and each of the walls 55. Wiring or cables that are received into or concealed within the wiring channel 20 in the vertical post 12 can also be received into or concealed within the wiring channel 66 of the corresponding base 14 such that no wiring is visible between the video screens and the rear of the base 14.

As shown, the bracket 56 is an L-shaped member having a vertical leg 57 and a horizontal leg 59. Alternatively, the bracket 56 can be T-shaped to extend both forward and backward in the base 14, or another functional shape to structurally interconnect the base 14 to the vertical post 12. The horizontal leg 59 of the bracket 56 fits into the channel 54 between the walls 55 and is secured in the channel 54 by one or more fasteners 58, such as bolts. The vertical leg 57 of the bracket 56 projects upward above the side members 50 and slidingly fits into the slot 23 between the walls 22A, 22B of the vertical post 12. This configuration permits the vertical post 12 to be slid downward onto the vertical leg 57 of the bracket 56 after the bracket 56 has been mounted to the base 14. One or more fasteners 60, such as bolts, securely attach the vertical post 12 to the vertical leg 57 of bracket 56. Although one mounting location for the bracket 56 in the base 14 is illustrated, the bracket 56 may be mounted further forward or rearward in the base 14 as required to balance the load of the video panels and other equipment mounted to the vertical posts 12.

The base 14 may include a front cover 62 and a back cover 63 that attach to the side members 50 of the base support 46, as shown in FIGS. 1 and 4, to improve the appearance of the base 14 once assembly has been completed.

The configuration of the video screen mounting system 10 is simple, quick to assemble, and minimizes the need for fasteners to attach the various components. The brackets 28 enable quick installation of the cross beams 16 onto the vertical posts 12 and repositioning of the cross beams 16 laterally as required. The mounting channels 40 in the cross beam 16 permit the vertical mounting brackets 42 to be quickly and easily installed at various horizontal positions.

Various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A video screen mounting system comprising:
a vertical post having a mounting wall;
a base supporting the vertical post;
a cross beam for mounting one or more video screens, the cross beam having a body, a mounting leg facing rearwardly with respect to the body, and at least one mounting channel located on one or more of a front, a top, and a bottom of the body; and
a bracket adapted to be removably mountable on the mounting wall of the vertical post and having a frontwardly extending flange for receiving and retaining the mounting leg of the cross beam;
wherein the bracket further includes a pair of rearwardly facing locking tabs and wherein the mounting wall includes a pair of slots for receiving the locking tabs of the bracket;
wherein the frontwardly extending flange of the bracket has an upwardly facing recess and the mounting leg of the cross beam has a downwardly protruding tip adapted to be received into the upwardly facing recess; and
wherein the cross beam has two symmetric mounting legs and symmetrically oriented mounting channels such that upper and lower portions of the cross beam are identical.

2. The video screen mounting system of claim 1, wherein the vertical post includes a pair of internal support walls separated by a slot of at least about ¾" in width, the support walls connecting the mounting wall to a rear wall to form a pair of laterally opening integral wiring channels each adapted to receive wiring for the one or more video screens, the support walls and the slot forming a barrier to electromagnetic interference between the two wiring channels.

3. The video screen mounting system of claim 2, further comprising a removable channel cover for enclosing each wiring channel in the vertical post.

4. A video screen mounting system comprising:
   a vertical post having a mounting wall, a pair of internal support walls separated by a slot of at least about ¾" in width, and a rear wall the support walls connecting the mounting a wall to the rear wall to form a pair of laterally opening integral wiring channels each adapted to receive wiring for one or more video screens, the support walls and the slot forming a barrier to electromagnetic interference between the two wiring channels;
   a base supporting the vertical post;
   a cross beam for mounting the one or more video screens, the cross beam having a body, a mounting leg facing rearwardly with respect to the body, and at least one mounting channel located on one or more of a front, a top, and a bottom of the body;
   a bracket adapted to be removably mountable on the mounting wall of the vertical post and having a frontwardly extending flange for receiving and retaining the mounting leg of the cross beam; and
   a vertical bracket extending upwardly from the base and slidingly engaging the slot in the vertical post for interconnecting the post to the base.

5. A video screen mounting system comprising:
   a vertical post having a mounting wall, a pair of internal support walls separated by a slot of at least about ¾" in width, and a rear wall, the support walls connecting the mounting wall to the rear wall to form a pair of laterally opening integral wiring channels each adapted to receive wiring for one or more video screens, the support walls and the slot forming a barrier to electromagnetic interference between the two wiring channels;
   a base supporting the vertical post, wherein the base includes a pair of integral wiring channels corresponding to the wiring channels in the vertical post, the wiring channels in the vertical post and in the base being contiguous;
   a cross beam for mounting the one or more video screens, the cross beam having a body, a mounting leg facing rearwardly with respect to the body, and at least one mounting channel located on one or more of a front, a top, and a bottom of the body; and
   a bracket adapted to be removably mounting on the mounting wall of the vertical post and having a frontwardly extending flange for receiving and retaining the mounting leg of the cross beam.

6. The video screen mounting system of claim 5, further comprising a removable channel cover for enclosing each wiring channel in the vertical post and another removable channel cover for enclosing each wiring channel in the base.

7. The video screen mounting system of claim 1, further comprising one or more vertical mounting brackets supported by the mounting channels in the cross beam.

8. The video screen mounting system of claim 1, wherein the base, the vertical post, and the cross beam are extruded members.

9. A video screen mounting system comprising:
   at least two vertical posts each having a mounting wall with pairs of mounting slots;
   a base corresponding to each mounting post, a vertical bracket extending upwardly from the base and slidingly engaging the corresponding vertical post for interconnecting each base to its respective vertical post;
   at least two cross beams each having a body, a mounting leg facing rearwardly with respect to the body, and a plurality of mounting channels located on one or more of a front, a top, and a bottom of the body; and
   a plurality of mounting brackets adapted to be removably mounted to the mounting wall of a vertical post, each mounting bracket including a pair of rearwardly facing locking tabs for engaging the mounting slots on the mounting wall, each mounting bracket having a frontwardly extending flange with an upwardly facing recess for receiving and retaining the mounting leg of a corresponding cross beam;
   wherein each of the mounting brackets further includes a pair of rearwardly facing locking tabs and wherein each of the mounting walls includes a pair of mounting slots for receving the locking tabs of the mounting brackets;
   wherein the frontwardly extending flange of each of the mounting brackets has an upwardly facing recess and the mounting leg of each of the cross beams has a downwardly protruding tip adapted to be received into the upwardly facing recess; and
   wherein each of the cross beams has two symmetric mounting legs and symmetrically oriented mounting channels such that upper and lower portions of the cross beam are identical.

10. The video screen mounting system of claim 9, wherein the vertical posts each include a pair of internal support walls separated by a slot of at least about ¾" in width, the support walls connecting the mounting wall to a rear wall to form a pair of laterally opening integral wiring channels each adapted to receive wiring for the one or more video screens, the support walls and the slot forming a barrier to electromagnetic interference between the two wiring channels.

11. The video screen mounting system of claim 10, further comprising a removable channel cover for enclosing each wiring channel in the vertical post.

12. The video screen mounting system of claim 9, wherein the base, the vertical post, and the cross beam are extruded members.

13. The video screen mounting system of claim 1, wherein the mounting wall on the vertical post is a front mounting wall and wherein the vertical post comprises:
   a rear wall; and
   a pair of support walls joining the front mounting wall to the rear wall, the support walls being separated by a slot of at least about ¾" in width, the support walls being positioned to form a pair of laterally outwardly opening wiring channels for receiving wiring for one or more video screens, the support walls and the slot forming a barrier to electromagnetic interference between the two wiring channels;
   wherein the slot is adapted to receive a bracket into an end of the vertical post; and
   wherein the wiring channels are each adapted to receive a cover for concealing wiring installed within the wiring channel.

14. The video screen mounting system of claim 1, further comprising an extruded base, the base comprising:
   a bottom wall;
   two spaced apart lateral side walls extending upwardly from the bottom wall;
   a pair of inner walls located laterally inward from the side walls and extending upwardly from the bottom wall, the inner walls defining a longitudinal channel adapted to receive a bracket; and
   at least one adjustable foot extending downwardly from the bottom wall;
   wherein wiring channels are formed between a portion of each side wall and an adjacent inner wall for receiving wiring, the channels being adapted to receive covers for concealing the wiring, the wiring channels each being adapted to receive a cover for concealing wiring installed within the wiring channel.

15. The video screen mounting system of claim 1, wherein there are at least two vertical posts each having a mounting wall with pairs of mounting slots; wherein there is a base corresponding to each mounting post, each base having a corresponding vertical bracket extending upwardly from the base and slidingly engaging the corresponding vertical post for interconnecting each base to its respective vertical post; and wherein the brackets are each adapted to be removably mounted to the mounting wall of one of the vertical posts.

16. The video screen mounting system of claim 1, wherein the two symmetric legs are recessed into a rear face of the cross beam.

17. The video screen mounting system of claim 16, wherein the mounting wall is a front wall of the post, the frontwardly extending flange of the bracket extends across the mounting wall, and the cross beam is dimensioned to bear against the mounting wall above and below the bracket when the downwardly protruding tip of the leg is received in the upwardly facing recess of the bracket.

18. The video screen mounting system of claim 1, wherein corresponding slopes of the leg and the frontwardly extending flange pull the cross beam toward the post as weight is applied to the bracket.

19. The video screen mounting system of claim 1, wherein the symmetrically oriented mounting channels comprise channels extending lengthways of the cross beam on both the top and the bottom or on both upper and lower parts of the front of the body.

\* \* \* \* \*